United States Patent [19]

Kurihara et al.

[11] Patent Number: 4,961,475
[45] Date of Patent: Oct. 9, 1990

[54] CRUISE CONTROL SYSTEM

[75] Inventors: Norimitsu Kurihara; Masahiko Asakura; Hidehiko Anzai, all of Saitama; Mitsuru Matsui, Gumma, all of Japan

[73] Assignees: Honda Giken Kogyo Kabushiki Kaisha; Mitsuba Electric Manufacturing Co., Ltd., both of Japan

[21] Appl. No.: 322,321

[22] Filed: Mar. 10, 1989

[30] Foreign Application Priority Data

Mar. 11, 1988 [JP] Japan .................. 63-57820
Mar. 11, 1988 [JP] Japan .................. 63-57821

[51] Int. Cl.$^5$ ............................ B60K 31/04
[52] U.S. Cl. ................. 180/179; 364/426.04
[58] Field of Search ............ 180/178, 179, 170; 364/424.05, 426.04

[56] References Cited

U.S. PATENT DOCUMENTS 4,267,491 5/1981 Collonia ..................... 180/179
4,821,831 4/1989 Onishi ....................... 180/178

FOREIGN PATENT DOCUMENTS 60-163735 8/1985 Japan .
0279141 12/1987 Japan ..................... 180/170
2176634 12/1986 United Kingdom ....... 180/178

Primary Examiner—Richard A. Bertsch
Assistant Examiner—Eric Culbreth
Attorney, Agent, or Firm—Skjerven, Morrill, MacPherson, Franklin & Friel

[57] ABSTRACT

A cruise control system for maintaining the speed of a vehicle at a fixed, set speed, comprising an actuator including an electric motor which actuates a speed control member via an electromagnetic clutch. To ensure the capability of the cruise control system to decelerate the vehicle even when it is traveling a steep and long downhill, and the normal operation of the cruise control system becomes inadequate for curbing the excessive increase of the vehicle speed, the electromagnetic clutch is disengaged whereby the speed control member is returned to the position for maximum deceleration. Since the operation of the cruise control system is not canceled even when the vehicle speed is increased substantially beyond the set speed, the cruise control system can readily return to its normal operation even after the vehicle is accelerated from the state of cruise control by stepping on the accelerator pedal, for instance for passing another car. To avoid frequent activation of the electromagnetic clutch, there may be defined an intermediate speed range in which a boosted deceleration signal is supplied to the electric motor for a deceleration action which is more boosted than a normal deceleration signal.

5 Claims, 4 Drawing Sheets 4,961,475

CRUISE CONTROL SYSTEM

TECHNICAL FIELD

The present invention relates to a cruise control system for maintaining the speed of a vehicle at a fixed, set speed, and in particular to such a cruise control system with an improved reliability.

BACKGROUND OF THE INVENTION

According to a conventional vehicle cruise control system, there is provided an actuator which is equipped with a speed control member coupled to the throttle valve and driven by a motor to perform a vehicle speed control action, and the use of an electric motor offers the advantage of an improved control accuracy.

In such a motor-driven actuator, an electromagnetic clutch may be interposed between the motor and the speed control member to the end of selectively transmitting the rotary power of the motor to the speed control member by engaging the clutch only when a constant-speed cruise condition is produced and otherwise preventing the interference of the electric motor upon the throttle pedal. Further, to facilitate the determination of the initial condition of the speed control member, a deceleration limit switch may be provided for the purpose of detecting the initial position of the speed control member in the path for conducting the electric current for the deceleration of the vehicle to the motor so that the unnecessary rotation of the motor in the direction to achieve a vehicle deceleration can be prevented; the limit switch opens itself to shut off the deceleration drive current when the speed control member has returned to its initial position. An example of such a cruise control system is disclosed, in copending U.S. patent application No. 233,641 filed Aug. 18, 1988, and reference is made to this copending patent application for more complete disclosure of a cruise control system of the aforementioned type.

However, in such a control circuit, if the vehicle runs downhill and encounters very little running resistance, the vehicle speed may rise to such an extent that the cruise control becomes inadequate to decelerate the vehicle to a desired extent even though the control circuit supplies a deceleration drive signal to the motor in order to drive the throttle valve in the direction to decelerate the vehicle. To curb such an excessive increase in the vehicle speed, it is possible to execute a cancel operation and disable the cruise control system altogether when the vehicle speed increases beyond the set speed by more than a predetermined value, as disclosed in Japanese patent laid-open publication No. 60-163735. However, this causes a significant inconvenience to the driver because, if he steps on the accelerator pedal to accelerate the vehicle from the state of cruise control, for instance, to pass another vehicle, the control system will be canceled, and the driver has to restart the cruise control system if he wishes to regain the state of cruise control after completion of the passing.

Further, if the deceleration limit switch fails and is frozen at its open state, the deceleration drive signal produced by the control circuit is not supplied to the motor since the state of the system is identical to that when the speed control member has reached its deceleration limit position, and the excessive increase in the vehicle speed cannot be prevented.

BRIEF SUMMARY OF THE INVENTION

In view of such problems of the prior art, a primary object of the present invention is to provide a cruise control system which can prevent the excessive increase in the vehicle speed without resorting to unnecessary canceling of the operation of the cruise control system when the vehicle speed has exceeded the set speed by more than a certain value.

A second object of the present invention is to provide a cruise control system which can smoothly carry out the deceleration control action for avoiding the excessive increase of the vehicle speed during the process of cruise control.

A third object of the present invention is to provide a cruise control system which is capable of an accurate control action and is yet reliable in operation.

According to the present invention these and other problems of the prior art can be solved by providing a cruise control system for maintaining the cruising speed of a vehicle at a fixed set speed, comprising: means for detecting the speed of the vehicle; control means for producing an acceleration and deceleration signal according to a speed signal supplied from the speed detecting means; an electric motor having an output shaft which rotates in either direction according to the acceleration and deceleration signal supplied from the control means; a speed control member coupled to the output shaft of the motor for increasing and decreasing the speed of the vehicle by acting upon a part of the vehicle according to the rotation of the output shaft of the motor; return spring means which urges the speed control member in a direction to decelerate the vehicle; and clutch means disposed between the output shaft and the speed control member and adapted to be activated by the control means; the control means disengaging the clutch means when the speed detecting means has detected that the speed of the vehicle has exceeded a first upper speed limit value which is higher than the set speed value.

By thus disengaging the clutch means when the vehicle speed has exceeded the set speed by more than a certain value, the operation of the cruise control system can be temporarily interrupted and the speed control member is quickly restored to its initial position for maximum deceleration of the vehicle. Further, by driving the motor in the direction for deceleration simultaneously as, before or after the disengagement of the clutch means, the speed control member for actually carrying out the deceleration action of the vehicle can be positively returned in the direction for deceleration even when, for instance, the clutch is mechanically seized by failure of any part thereof.

According to such a motor-driven actuator, the electromagnetic clutch is disengaged whenever the vehicle speed has increased beyond the upper limit so as to set the speed control member free and permit the throttle member to be fully closed by the action of its return spring. However, when the vehicle travels on a long downhill slope, the engagement and disengagement of the electromagnetic clutch may repeatedly may take place in the vicinity of the upper limit of the vehicle speed, and the durability of the electromagnetic clutch may be impaired.

To eliminate this problem, the present invention further offers an embodiment in which the control means supplies a boosted deceleration signal to the electric motor when the speed detecting means has detected that the speed of the vehicle has exceeded a second upper speed limit value which is higher than the set speed value but lower than the first upper speed limit value.

By thus supplying a deceleration control signal which is larger than a normal deceleration control signal to the actuator when the vehicle speed is higher than the second upper limit value but lower than the first upper limit value, and supplying a clutch disengage signal to the clutch means when the vehicle speed has increased beyond the first upper limit value, the immediate disengagement of the clutch means following a slight increase of the vehicle speed beyond the set speed can be avoided.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
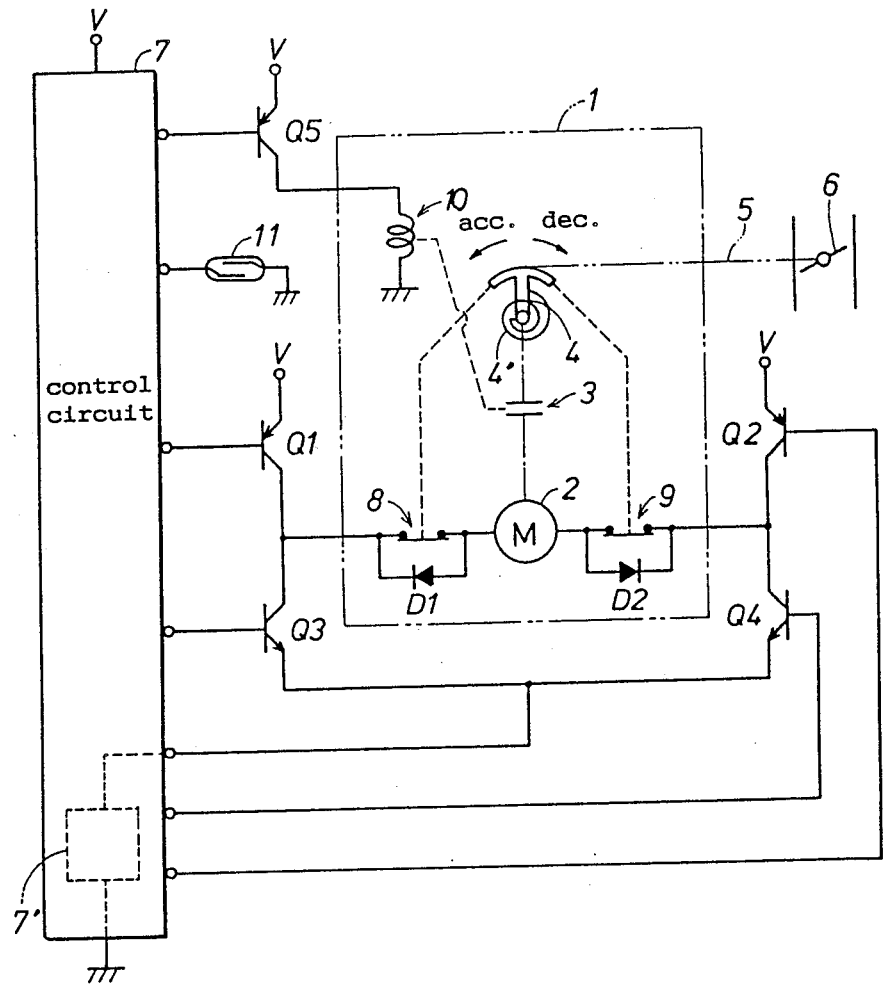
FIG. 1 is a simplified circuit diagram of an essential part of the control circuit of a vehicle cruise control system to which the present invention is applied.

In FIG. 1, a reversible motor drive circuit for a motor 2 serving as the drive source for the actuator 1 of a vehicle cruise control system is constructed from a known transistor bridge circuit consisting of four transistors $Q_1$ through $Q_4$. The drive shaft of the motor 2 is coupled to a speed control member 4 via an electromagnetic clutch 3, and the speed control member 4 is in turn coupled to a throttle valve 6 via a throttle wire 5. Therefore, when the electromagnetic clutch 3 is engaged, the throttle valve 6 is actuated according to the rotation of the motor 2. Further, the speed control member 4 is urged by a spring member 4' in the direction to close the throttle valve 6 or to decelerate the vehicle.

In the above described bridge circuit, the emitters of the transistors $Q_1$ and $Q_2$ are connected to a power source terminal V common or separate with other power terminals V in FIG. 1, and the emitters of the transistors $Q_3$ and $Q_4$ are grounded via a control circuit 7 and a motor current detection circuit 7' incorporated in the control circuit 7, the collectors of the transistors $Q_1$ and $Q_2$ being connected to the collectors of the transistors $Q_3$ and $Q_4$, respectively. Further, the node between the collectors of the transistors $Q_1$ and $Q_3$ and the node between the collectors of the transistors $Q_2$ and $Q_4$ are connected to either end of the motor 2, via normally closed limit switches 8 and 9. Therefore, by supplying an ON signal from the control circuit 7 to the transistors $Q_1$ and $Q_4$, the motor 2 can be driven in the direction to cause the movement of the speed control member 4 which tends to open the throttle valve 6 or to accelerate the vehicle. Alternatively, by supplying an ON signal from the control circuit 7 to the transistors $Q_2$ and $Q_3$, the motor 2 can be driven in the opposite direction to cause the movement of the speed control member 4 which tends to decelerate the vehicle.

The limit switches 8 and 9 are adapted in such a manner that the limit switch 8 opens when the speed control member 4 has reached the limit of its motion to accelerate the vehicle and the limit switch 9 opens when the speed control member 4 has reached the limit of its motion to decelerate the vehicle. A diode $D_1$ is connected across the limit switch 8 so as to conduct the electric current to decelerate the vehicle to the motor 2, and another diode $D_2$ is connected across the limit switch 9 so as to conduct the electric current to accelerate the vehicle to the motor 2. Thereby, the rotation of the motor 2 beyond its limits can be favorably avoided.

The electromagnetic coil 10 of the electromagnetic clutch 3 is driven by a transistor $Q_5$ which is on-off controlled by the control circuit 7. A pulse signal is supplied from a vehicle speed sensor 11 to the control circuit 7 which computes a vehicle speed at each of its operation cycles.

Figure 2:
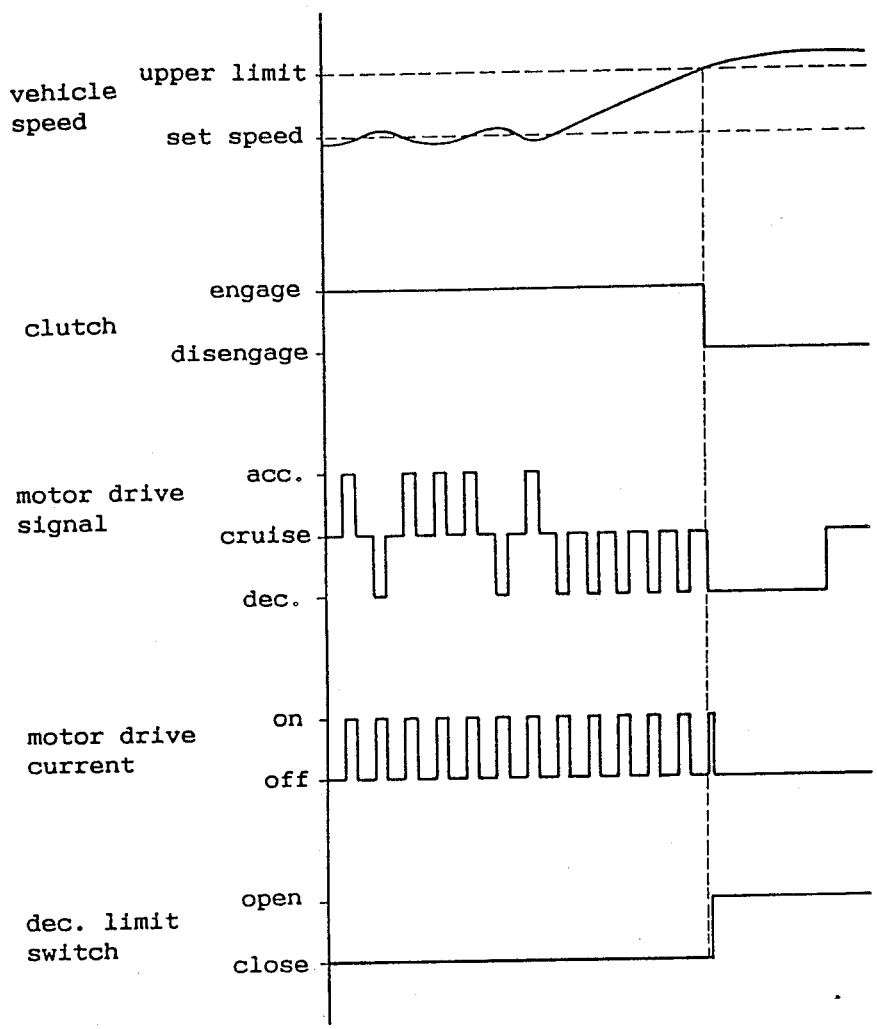
FIGS. 2 through 4 are time charts for showing the various modes of operation of the vehicle cruise control system according to the present invention.

Now the operation of the present embodiment is described in the following with reference to FIG. 2.

When the cruise control system is set to the state of cruise control, the electromagnetic clutch 3 is engaged. According to the deviation of the vehicle speed from the set speed of the cruise control, a desired degree of acceleration or deceleration is computed from the difference between the current vehicle speed and the previous vehicle speed, in addition to the deviation of the vehicle speed from the set speed, for each control cycle (for instance every 250 ms), and an ON signal having a duty ratio which corresponds to the control value computed from such data is supplied from the control circuit 7 to the transistors $Q_1$ and $Q_4$, or the transistors $Q_2$ and $Q_3$, as the case may be, to rotate the motor 2 in the direction either to accelerate or to decelerate the vehicle so as to maintain the vehicle speed at the set value.

When the vehicle goes downhill and the vehicle speed increases due to reduced running resistance, a deceleration signal is supplied to the motor 2. If the downward slope is steep and long enough, the vehicle speed keeps increasing even when the deceleration signal is continually supplied to the motor 2. When the vehicle speed has exceeded the set speed by a certain upper limit value which may be, for instance, 10 km/h higher than the set speed value, an OFF signal is supplied from the control circuit 7 to the transistor $Q_5$ to disengage the electromagnetic clutch 3. As a result, the speed control member 4 becomes free, and the throttle valve 6 is restored to its fully closed state by the spring force of the return spring 4' so that a powerful engine brake is obtained and the excessive increase in the vehicle speed can be prevented.

At the same time, an ON signal is supplied from the control circuit 7 to the transistors $Q_2$ and $Q_3$ to rotate the motor 2 in the direction to decelerate the vehicle for a certain time interval, for instance one to two seconds. This serves the purpose of positively driving the throttle valve 6 to its fully closed state even when the electromagnetic clutch 3 is mechanically seized by failure of any part thereof.

According to the above described control action, since the state of cruise control is not canceled, the state of cruise control may be readily restored when the vehicle speed has decreased to a level which is not higher than the set speed by the predetermined value.

In the above described embodiment, the motor 2 is rotated in the direction to decelerate the vehicle substantially at the same time as disengaging the electromagnetic clutch 3 when the vehicle speed has exceeded the set speed by more than the predetermined value, but it is also possible that the electromagnetic clutch 3 is disengaged after the motor 2 has rotated in the direction to decelerate the vehicle for a certain time interval.

Figure 3:
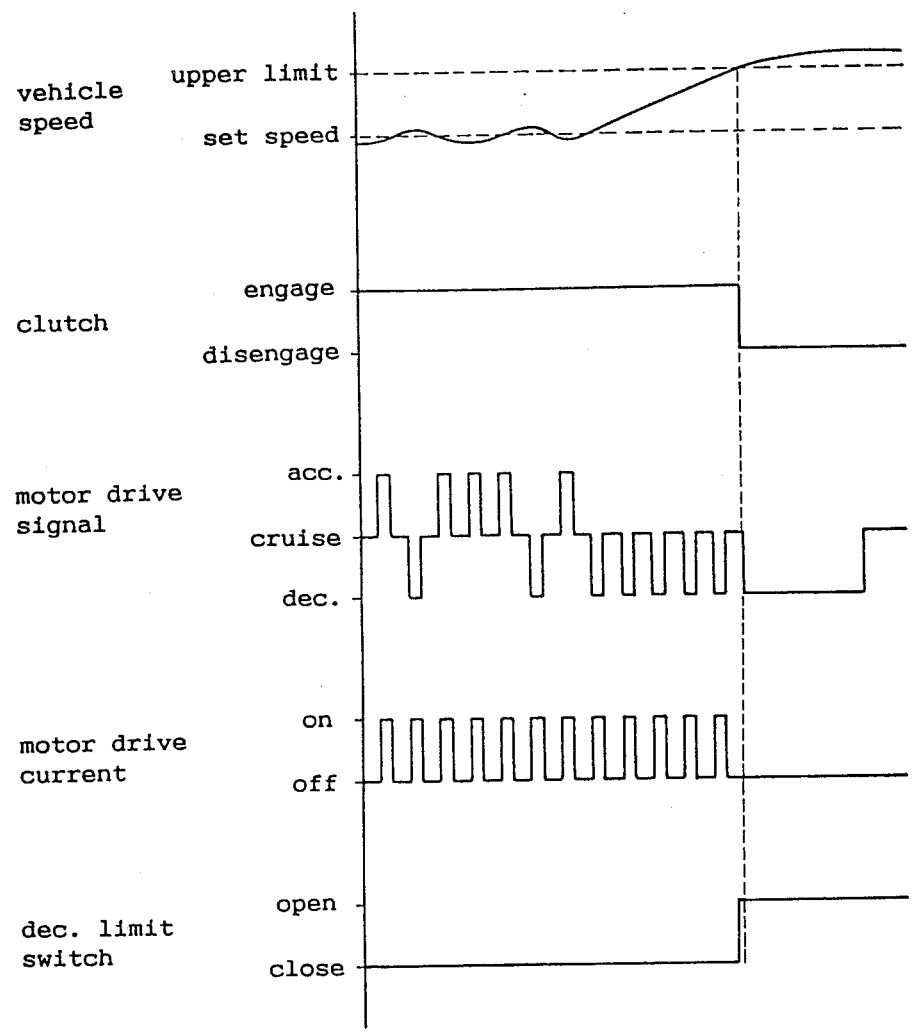

For instance, when the deceleration limit switch 9 has failed and is frozen at its open state as shown in the time chart of FIG. 3, the motor 2 would not rotate in the direction to decelerate the vehicle even when the vehicle speed has exceeded the set value by more than the predetermined value because the state of the system is identical to that when the speed control member 4 has reached the position for maximum deceleration of the vehicle, but, according to the present embodiment, since the electromagnetic clutch 3 is disengaged and the speed control member 4 is free, the throttle valve 6 can be safely fully closed by the return spring 4'. Therefore, even when the deceleration limit switch 9 has failed and is frozen at its open state, the excessive increase of the vehicle speed can be prevented.

Further, when the accelerator pedal is depressed to pass another car during cruise control, even when the vehicle speed is increased beyond the upper limit, the above described process is carried out so as to only temporarily interrupt the cruise control, instead of carrying out a canceling process, and the state of cruise control is readily restored after the passing is completed.

Figure 4:
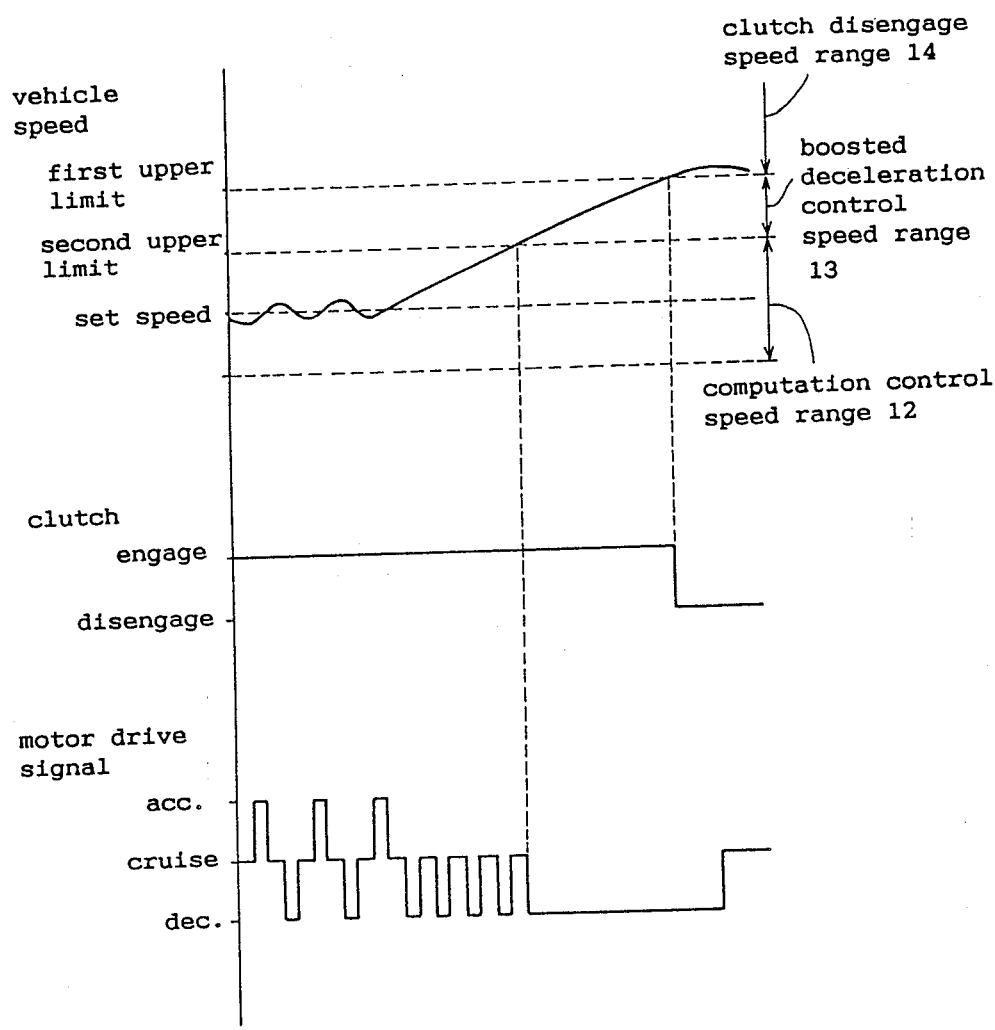

FIG. 4 shows a time chart showing the mode of operation of a second embodiment of the present invention which is similar to the preceding embodiment in the structure of its hardware, but is based on a slightly different mode of operation.

When the cruise control system is set to the state of cruise control, the electromagnetic clutch 3 is engaged. A computation control speed range 12 is defined above and below the set speed at a width of 4 to 6 km/h in either direction so that the normal acceleration and deceleration control may be carried out to maintain the vehicle speed at the set speed. When the vehicle speed varies within this computation control speed range 12, an acceleration or deceleration level is computed from the difference between the current vehicle speed and the previous vehicle speed, as well as the deviation of the vehicle speed from the set speed, for each control cycle (for instance 250 ms). And, an ON signal having a duty ratio which corresponds to the control value computed from such data is supplied from the control circuit 7 to the transistors $Q_1$ and $Q_4$, or the transistors $Q_2$ and $Q_3$, as the case may be, to rotate the motor 2 in the direction either to accelerate or to decelerate the vehicle so as to maintain the vehicle speed at the set value.

Above the computation control speed range 12 or beyond the first upper limit which is higher than the set speed value by 4 to 6 km/h, there is defined a boosted deceleration control speed range 13 for carrying out a deceleration control with a deceleration control value which is larger than the normal deceleration control value in the computation control speed range 12. A similar boosted acceleration control speed range may be additionally defined below the lower limit of the computation control speed range 12 which is defined immediately below the set speed value, so that a boosted acceleration signal may be produced when appropriate. Further, a second upper limit value is defined at a level which is higher than the set speed value, for instance, by 10 km/h, and a clutch disengage speed range 14 is defined above this second upper limit value for supplying an off signal from the control circuit 7 to the transistor $Q_5$ and disengaging the electromagnetic clutch 3.

In the boosted deceleration control speed range 13, by supplying a deceleration drive signal, for instance, continually to the motor 2, a larger deceleration control is performed than in the computation control speed range 12. It is also possible to intermittently supply the deceleration drive signal in the form of a pulse signal having a greater pulse width than that in the computation control speed range 12.

When the vehicle speed has reached the clutch disengaged speed range 14 or has exceeded the upper limit of the boosted deceleration control speed range 13, the speed control member 4 is set free by the disengagement of the electromagnetic clutch 3, and the throttle valve 6 is returned to its fully closed state by the return spring 4' so that the excessive rise of the vehicle speed is effectively controlled by engine brake. Further, the deceleration drive signal is supplied to the motor 2 for a certain time interval after a clutch disengage signal is supplied to the electromagnetic clutch 3, whereby the speed control member 4 may be positively driven to the deceleration limit position even when the mechanical seizure of the electromagnetic clutch 3 or other failure has occurred.

Thus, when the vehicle speed has increased beyond the computation control speed range 12, for instance, when the vehicle travels along a long downhill road, an effective deceleration control is carried out with a degree of deceleration which is greater than that in the computation control speed range 12. Therefore, the boosted control action against the increase of the vehicle speed effectively limits the increase of the vehicle speed to the clutch disengage speed range 14, and the frequent engagement and disengagement of the electromagnetic clutch 3 can be avoided.

According to the above described embodiment, since a boosted deceleration control signal which is larger than a normal deceleration control signal is first supplied to the actuator to limit the increase of the vehicle speed when the vehicle speed is relatively higher than the set speed, the frequent disengagement of the clutch due to the increase in the vehicle speed can be avoided. The reduction in the frequency of the engagement and disengagement of the clutch contributes to the improvement of the durability of the clutch and, since the clutch disengagement control takes place only after the control by the relatively boosted deceleration control signal has been carried out, the overall deceleration control can be very smoothly carried out among other advantages of the present invention.

What We claim is:

1. A cruise control system for maintaining the cruising speed of a vehicle at a set speed, comprising:
   means for detecting the speed of the vehicle;
   control means for providing an acceleration and deceleration signal according to a speed signal supplied from said speed detecting means;
   an electric motor having an output shaft which rotates in either of two directions according to said acceleration and deceleration signal provided from said control means;
   a speed control member coupled to said output shaft of said motor for increasing and decreasing the speed of the vehicle by acting upon a part of the vehicle according to the direction of rotation of said output shaft of said motor;
   return spring means for urging said speed control member in a direction to decelerate the vehicle; and
   clutch means disposed between said output shaft and said speed control member for connecting said output shaft to said speed control member and adapted to be activated by said control means;

wherein said control means actuates said electric motor to accelerate or decelerate the vehicle to maintain the cruising speed of the vehicle at the set speed in response to the vehicle speed as detected by said speed detecting means being not higher than a first upper speed limit which is higher than said set speed by a predetermined amount, and disengages said clutch means in response to the vehicle speed as detected by said speed detecting means being higher than said first upper speed limit.

2. A cruise control system as defined in claim 1, wherein said electric motor is driven in the direction to decelerate the vehicle for a certain time interval substantially at the same time as said clutch means is disengaged when said speed detecting means has detected that the speed of the vehicle has exceeded said first upper speed limit.

3. A cruise control system as defined in claim 1, wherein said control means supplies an increased deceleration signal to said electric motor when said speed detecting means has detected that the speed of the vehicle has exceeded a second upper speed limit which is higher than said set speed but lower than said first upper speed limit.

4. A cruise control system as defined in claim 1, further comprising a limit switch which deactivates said electric motor and is actuated by said speed control member as said speed control member reaches a deceleration limit position.

5. A cruise control system as defined in claim 4, further comprising a second limit switch which deactivates said electric motor and which is activated by said speed control member as said speed control member reaches an acceleration limit position.

* * * * *